(12) United States Patent
Doebbeler et al.

(10) Patent No.: US 10,716,176 B2
(45) Date of Patent: Jul. 14, 2020

(54) APPARATUS AND METHOD FOR DYNAMICALLY ADJUSTING AN ELECTRIC ARC FURNACE

(71) Applicant: Siemens Aktiengesellschaft, Munich (DE)

(72) Inventors: Arno Doebbeler, Herzogenaurach (DE); Werner Hartmann, Weisendorf (DE); Martin Hergt, Nuremberg (DE); Juergen Rupp, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 761 days.

(21) Appl. No.: 15/300,824

(22) PCT Filed: Feb. 13, 2015

(86) PCT No.: PCT/EP2015/053063
§ 371 (c)(1),
(2) Date: Sep. 30, 2016

(87) PCT Pub. No.: WO2015/149980
PCT Pub. Date: Oct. 8, 2015

(65) Prior Publication Data
US 2017/0027027 A1 Jan. 26, 2017

(30) Foreign Application Priority Data

Mar. 31, 2014 (DE) .................. 10 2014 206 008

(51) Int. Cl.
*H05B 7/148* (2006.01)
(52) U.S. Cl.
CPC ............ *H05B 7/148* (2013.01); *Y02P 10/256* (2015.11); *Y02P 10/259* (2015.11)

(58) Field of Classification Search
CPC .... Y02P 10/256; Y02P 10/259; Y02P 10/253; H05B 7/148; H05B 6/067
(Continued)

(56) References Cited

U.S. PATENT DOCUMENTS 2,207,746 A * 7/1940 Maler .................. C22B 5/16
373/62
3,835,430 A * 9/1974 Kocsis .................. H01F 27/365
336/83
(Continued)

FOREIGN PATENT DOCUMENTS

CN 1481198 A 3/2004 ............... H02J 3/18
CN 101394694 A 3/2009 ............... F27B 3/28
(Continued)

OTHER PUBLICATIONS

Chinese Office Action, Application No. 201580018032.7, 12 pages, dated Feb. 11, 2018.
(Continued)

*Primary Examiner* — Jimmy Chou
(74) *Attorney, Agent, or Firm* — Slayden Grubert Beard PLLC

(57) ABSTRACT

An apparatus for regulating an electric arc furnace connected to a power supply system with at least one system phase that applies an AC voltage to a furnace electrode and an arc current for melting. A control loop device includes an electrical converter designed for negative feedback of an amplitude and/or frequency of the AC voltage to produce an amplitude and/or frequency of the arc current. The converter includes an input port having a system power supply connected thereto, and an output port having a melting furnace power supply and a primary circuit of a first transformer connected thereto, wherein a secondary circuit of the first transformer is connected to the arc furnace electrode. A primary coil of a second transformer is connected in parallel
(Continued)

with the converter input port, and a secondary coil of the first transformer is connected in series with a secondary coil of the second transformer.

13 Claims, 2 Drawing Sheets

(58) Field of Classification Search
USPC .............. 219/130.01, 130.1, 130.21, 130.31,
219/130.32, 130.33, 130.4, 130.5, 130.51,
219/133, 137 PS; 373/44, 45, 46, 49, 60,
373/63, 66, 78, 79, 81, 88, 102, 104, 105,
373/109
See application file for complete search history.

(56) References Cited

U.S. PATENT DOCUMENTS

| | | | | |
|---|---|---|---|---|
| 4,388,108 A * | 6/1983 | Rozenberg | ............. | H05B 7/144 373/102 |
| 4,400,816 A * | 8/1983 | Robare | ................. | H05B 7/144 373/104 |
| 4,403,327 A * | 9/1983 | Granstrom | ............... | H05B 6/02 373/102 |
| 4,607,374 A * | 8/1986 | Inagaki | ................... | H05B 7/148 373/104 |
| 4,620,308 A * | 10/1986 | Persson | ................. | H05B 7/148 373/105 |
| 4,663,764 A * | 5/1987 | Bretthauer | ............. | H05B 7/148 373/104 |
| 4,677,643 A * | 6/1987 | Dicks | ..................... | H05B 7/156 373/105 |
| 4,956,566 A * | 9/1990 | Rupp | ................. | G01D 5/24404 324/207.25 |
| 5,115,447 A * | 5/1992 | Bowman | ............... | C21C 5/5211 373/102 |
| 5,138,629 A * | 8/1992 | Maki | ..................... | C21C 5/5229 373/102 |
| 5,138,630 A * | 8/1992 | Suga | ..................... | C21C 5/5229 373/101 |
| 5,155,740 A * | 10/1992 | Ao | ........................ | C21C 5/5229 323/210 |
| 5,204,872 A * | 4/1993 | Staib | ...................... | H05B 7/148 373/102 |
| 5,351,267 A * | 9/1994 | Strebel | ................... | H05B 7/148 373/104 |
| 5,438,588 A * | 8/1995 | Wanner | ................. | C21C 5/5229 373/102 |
| 5,533,044 A * | 7/1996 | Strebel | ................... | H05B 7/156 373/104 |
| 5,589,760 A * | 12/1996 | Lee | ........................... | G05F 1/13 323/247 |
| 5,610,937 A * | 3/1997 | Gaupp | ................... | C21C 5/5229 373/102 |
| 5,617,447 A * | 4/1997 | Tambe | ................... | H02J 3/1892 323/211 |
| 5,627,454 A * | 5/1997 | Aebischer | ............. | H02J 3/1892 323/210 |
| 5,809,054 A * | 9/1998 | Oelscher | .............. | H02J 3/1892 323/210 |
| 6,104,744 A * | 8/2000 | Poppe | ..................... | F27D 11/10 373/102 |
| 6,157,666 A * | 12/2000 | Della Vedova | ........ | H05B 7/005 373/102 |
| 6,226,313 B1 * | 5/2001 | Thamodharan | ........ | H05B 7/005 373/102 |
| 6,274,851 B1 * | 8/2001 | Mulcahy | ............... | H05B 7/005 219/497 |
| 6,411,643 B1 * | 6/2002 | Schreiter | ............... | H05B 7/148 373/104 |
| 6,421,366 B1 * | 7/2002 | Breker | ..................... | F27B 3/085 373/102 |
| 6,573,691 B2 * | 6/2003 | Ma | ........................ | H02J 3/1864 323/209 |
| 6,608,857 B2 * | 8/2003 | Thamodharan | ........ | H05B 7/005 373/102 |
| 6,687,284 B1 * | 2/2004 | Beauregard | ............... | H05B 7/00 219/121.11 |
| 6,810,069 B2 * | 10/2004 | Kojovic | .................... | H02H 3/28 219/503 |
| 7,351,931 B2 * | 4/2008 | Yoshida | .............. | H01F 27/2804 219/130.21 |
| 8,023,550 B2 * | 9/2011 | Dobbeler | ............... | H05B 7/005 373/102 |
| 8,933,378 B2 | 1/2015 | Hörger et al. | ................ | 219/497 |
| 2002/0136260 A1 * | 9/2002 | Ma | ......................... | H05B 7/148 373/104 |
| 2003/0048828 A1 * | 3/2003 | Titus | ....................... | C03B 5/005 373/29 |
| 2005/0006367 A1 * | 1/2005 | Dodge | .................. | B23K 9/1006 219/130.1 |
| 2005/0263514 A1 * | 12/2005 | Albrecht | ............... | B23K 9/1006 219/133 |
| 2006/0114963 A1 * | 6/2006 | Gerhan | ................... | H05B 7/144 373/102 |
| 2007/0181547 A1 * | 8/2007 | Vogel | .................... | B23K 9/1081 219/130.1 |
| 2008/0056327 A1 * | 3/2008 | Gerritsen | ................ | F27D 11/10 373/102 |
| 2008/0063024 A1 * | 3/2008 | Pasch | ..................... | H05B 7/148 373/105 |
| 2008/0087653 A1 * | 4/2008 | Furman | .................... | B23K 9/10 219/130.21 |
| 2008/0123714 A1 * | 5/2008 | Konig | .................... | H05B 7/005 373/104 |
| 2008/0190906 A1 * | 8/2008 | Aigner | .................. | H02M 3/335 219/130.21 |
| 2008/0285615 A1 * | 11/2008 | Fink | ....................... | C21C 5/5211 373/104 |
| 2010/0147831 A1 * | 6/2010 | Minoue | .................... | H05B 6/06 219/600 |
| 2011/0007773 A1 * | 1/2011 | Dobbeler | ............... | C21C 5/5211 373/60 |
| 2011/0049115 A1 * | 3/2011 | Luo | ...................... | B23K 9/1056 219/130.21 |
| 2011/0176575 A1 * | 7/2011 | Horger | ................... | H05B 7/005 373/104 |
| 2011/0216802 A1 * | 9/2011 | Wallmeier | .......... | H02M 5/2573 373/104 |
| 2011/0292961 A1 * | 12/2011 | Matschullat | .......... | C21C 5/5211 373/60 |
| 2012/0183010 A1 * | 7/2012 | Dittmer | ................. | C21C 5/5211 373/104 |
| 2012/0314728 A1 * | 12/2012 | Benzerrouk | ........... | H05B 7/144 373/102 |
| 2013/0051423 A1 * | 2/2013 | Dittmer | .................... | C21C 5/527 373/81 |
| 2013/0140298 A1 * | 6/2013 | Uchida | ............. | H01L 21/67109 219/634 |
| 2014/0185645 A1 * | 7/2014 | Dobbeler | .................. | F27B 3/28 373/104 |
| 2014/0251965 A1 * | 9/2014 | Wiryadinata | ........ | B23K 9/0953 219/130.1 |
| 2014/0374398 A1 * | 12/2014 | Manthe | ................ | B23K 9/1043 219/130.21 |
| 2015/0375330 A1 * | 12/2015 | Doi | ....................... | B23K 9/1006 219/132 |

FOREIGN PATENT DOCUMENTS

| | | | | |
|---|---|---|---|---|
| CN | 201466732 U | 5/2010 | ................ | F27B 3/28 |
| CN | 102761131 A | 10/2012 | .............. | H02H 7/00 |
| DE | 102005051232 A1 | 5/2007 | .............. | H05B 7/148 |
| DE | 102008049610 A1 | 4/2010 | ................ | G05F 1/70 |
| EP | 1318588 A2 | 6/2003 | ................ | H02J 3/18 |
| EP | 2497747 A1 | 9/2012 | ........... | C01B 33/025 |
| EP | 2549614 A1 | 1/2013 | ................ | H02J 3/18 |
| FR | 1299494 A | 7/1962 | ................ | G05F 3/06 |

(56) References Cited

FOREIGN PATENT DOCUMENTS

| GB | 584007 A | 1/1947 | ............ H05B 7/152 |
| RU | 2216883 C2 | 11/2003 | ............ H02M 7/162 |
| WO | 93/14557 A1 | 7/1993 | ............ B23K 9/073 |
| WO | 2015/149980 A1 | 10/2015 | ............ H05B 7/148 |

OTHER PUBLICATIONS

German Office Action, Application No. 102014206008.7, 7 pages, dated Jan. 15, 2015.
International Search Report and Written Opinion, Application No. PCT/EP2015/053063, 18 pages, dated Jun. 3, 2015.
Russian Office Action, Application No. 2016130313/07, 5 pages, dated Dec. 19, 2017.

\* cited by examiner

APPARATUS AND METHOD FOR DYNAMICALLY ADJUSTING AN ELECTRIC ARC FURNACE

CROSS-REFERENCE TO RELATED APPLICATIONS

This application is a U.S. National Stage Application of International Application No. PCT/EP2015/053063 filed Feb. 13, 2015, which designates the United States of America, and claims priority to DE Application No. 10 2014 206 008.7 filed Mar. 31, 2014, the contents of which are hereby incorporated by reference in their entirety.

TECHNICAL FIELD

The present invention relates to an apparatus for dynamically regulating an electric arc furnace and a corresponding method.

BACKGROUND

An electric arc, in particular in the case of a three-phase alternating current supply, supplies energy in the form of arcs through three graphite electrodes to a melting furnace. A melting furnace of this sort is, for example, an electric arc furnace, or EAF. Usually for this purpose the medium voltage or high voltage is transformed down to a low voltage and supplied to the electrodes with the aid of a furnace transformer. The electrodes can be moved mechanically upwards or downwards in order to ignite the arc and then, by means of the spacing, to adjust the arc voltage and the current, and thus the power coupled in. Since in each phase the current becomes zero twice in each period, there is a risk that the arc extinguishes if a current is not developed in the opposite direction with a sufficiently steep current rise before the plasma that is present cools down too far.

Conventionally a sufficiently large inductor in the circuit ensures that the current persists for long enough that, at the current zero-transition, the voltage is already high enough to maintain the flow of current. This has the result that the arc furnace can only be operated up to a certain power factor cos φ, and has a high reactive power requirement. Typical values for the power factor lie around about 0.83 and this, with a transformer having an apparent power of 100 MVA yields a real power input of 83 MW and a reactive power of 56 MVAr. The electrical operating equipment can therefore not be optimally utilized. Conventionally, a regulation of an arc furnace is in the range of seconds, as a consequence of the mechanical movement of the electrodes.

SUMMARY

One embodiment provides an apparatus for dynamically adjusting an electric arc furnace electrically connected to a power supply system with at least one system phase for applying an alternating electrical voltage and an arc current to a furnace electrode, the apparatus comprising: a control loop device comprising an electrical converter configured for reverse feedback of an amplitude and/or a frequency of the alternating voltage to an amplitude and/or a frequency of the arc current, wherein the converter is a two-port network comprising an input port and an output port, wherein a power supply system is attached to the input port and a melting furnace power supply is connected to the output port, wherein a primary circuit of a first transformer is electrically connected to the output port, and a secondary circuit of the first transformer is electrically connected to the furnace electrode of the electric arc furnace, and wherein a primary coil of a second transformer is electrically connected in parallel to the input port of the converter, and a secondary coil of the first transformer is electrically connected in series with a secondary coil of the second transformer.

In one embodiment, a ratio of a primary electric rated power of the first transformer to one of the second transformer can be adjusted by means of appropriate dimensioning.

In one embodiment, the ratio of the primary electric rated power of the first transformer to that of the second transformer is 1:3.

In one embodiment, the first transformer or the second transformer is a furnace transformer that is already present.

In one embodiment, the first transformer is a step-up or boost transformer.

In one embodiment, the first transformer is removed, and the output port of the converter is electrically connected in series with the secondary coil of the second transformer and to the furnace electrode.

In one embodiment, the converter adjusts the amplitude and/or the frequency of the alternating electrical voltage as the manipulated variable for controlling the amplitude and/or frequency of the arc current as the controlled variable.

In one embodiment, the converter adjusts the amplitude and/or the frequency of the arc current as the manipulated variable for controlling the aptitude and/or frequency of the alternating electrical voltage as the controlled variable.

In one embodiment, the converter increases the amplitude and/or the frequency of the alternating voltage when the amplitude and/or the frequency of the arc current is decreased, and vice versa.

In one embodiment, the converter decreases the amplitude and/or the frequency of the arc current when the amplitude and/or frequency of the alternating voltage increases, and vice versa.

In one embodiment, the converter converts an alternating magnitude of the power supply system into an alternating magnitude of the furnace electrode with phase synchronicity.

In one embodiment, the converter is configured for electrical connection to any desired voltage level of the electrical power supply system.

In one embodiment, the electric arc furnace comprises three graphite furnace electrodes supplied with power by three system phases, wherein amplitudes and/or frequencies are controllable by three converters.

In one embodiment, amplitudes and/or frequencies are separately controllable by three converters.

In one embodiment, a spacing device for the respective furnace electrodes adjusts distances of the furnace electrodes from a melt as a working point.

In one embodiment, a power factor of each phase is greater than 0.84.

Another embodiment provides a method for dynamically adjusting an electric arc furnace electrically connected to a power supply system with at least one system phase for applying an alternating electrical voltage and an arc current to a furnace electrode, the method comprising: controlling, by a control loop device comprising an electrical converter, using reverse feedback, an amplitude and/or a frequency of the alternating voltage to an amplitude and/or a frequency of the arc current, wherein the converter is a two-port network comprising an input port and an output port, supplying mains power to the input port, supplying melting furnace power at the output port, wherein a primary circuit of a first transformer is electrically connected to the output port, and a secondary circuit of the first transformer is electrically connected to the furnace electrode of the electric arc furnace, wherein a primary coil of a second transformer is electrically connected in parallel to the input port of the converter, and a secondary coil of the first transformer is electrically connected in series with a secondary coil of the second transformer.

In one embodiment, a ratio of a primary electrical rated power of the first transformer to a primary electrical rated power of the second transformer is adjusted by appropriate dimensioning.

In one embodiment, the ratio of the primary electric rated power of the first transformer to the primary electrical rated power of the second transformer is set as 1:3.

In one embodiment, the first transformer or the second transformer is a furnace transformer.

In one embodiment, the first transformer is a step-up or boost transformer.

In one embodiment, the converter adjusts the amplitude and/or the frequency of the alternating electric voltage as the manipulated variable for controlling the amplitude and/or frequency of the arc current as the controlled variable.

In one embodiment, the converter adjusts the amplitude and/or the frequency of the arc current as the manipulated variable for controlling the amplitude and/or frequency of the alternating electrical voltage as the controlled variable.

In one embodiment, the converter increases the amplitude and/or the frequency of the alternating voltage when the attitude and/or the frequency of the arc current is decreased, and decreases the amplitude and/or the frequency of the alternating voltage when the attitude and/or the frequency of the arc current is increased.

In one embodiment, the converter decreases the amplitude and/or the frequency of the arc current when the amplitude and/or the frequency of the alternating voltage increases, and increases the amplitude and/or the frequency of the arc current when the amplitude and/or the frequency of the alternating voltage decreases.

In one embodiment, the converter converts an alternating magnitude of the power supply system into the alternating magnitude of the furnace electrode with phase synchronicity.

In one embodiment, the converter is electrically connectable to any selected voltage level of an electrical power supply system.

In one embodiment, the electric arc furnace comprises three graphite furnace electrodes supplied with power by three system phases, wherein amplitudes and/or frequencies are regulated by three converters.

In one embodiment, the amplitudes and/or frequencies are separately controllable by three converters.

In one embodiment, a spacing device for the respective furnace electrodes adjusts distances of the respective furnace electrodes from a melt as a working point.

In one embodiment, at each furnace electrode, a power factor of each phase is greater than 0.84.

In one embodiment, a regulation of an arc is carried out in a period of milliseconds.

In one embodiment, an ignition pulse is additionally injected at a zero transition of the current.

BRIEF DESCRIPTION OF THE DRAWINGS

Example aspects and embodiments of the invention are described in more detail with reference to the figures, in which.

DETAILED DESCRIPTION

Figure 1:
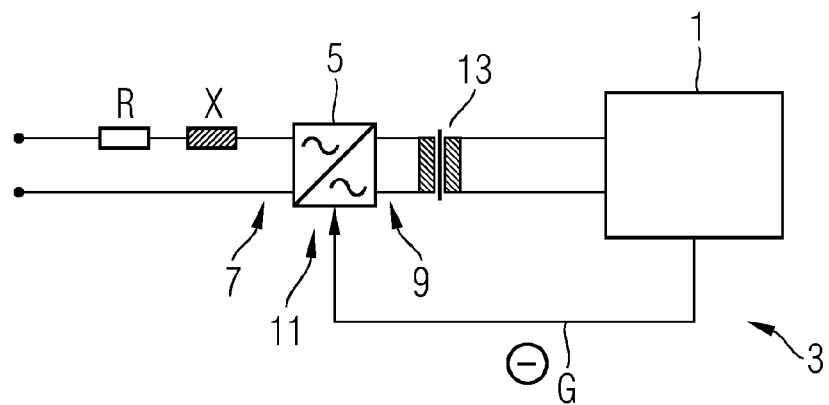
FIG. 1 shows a first example embodiment of an apparatus according to the invention.

Embodiments of the present invention may reduce a conventional phase shift between the current and voltage in an electric arc furnace, and thus to increase a power factor and to reduce a reactive power component, while avoiding extinguishing the associated arc. Only one furnace transformer, without a conventional tap-changing switch used for adjusting a secondary voltage, and a compensation installation that is small relative to the prior art, will be required. It will be possible to adjust the voltage at the electrodes smoothly and with high dynamic performance, and in particular asymmetrically. It will be possible to implement a fast, and thereby dynamic, regulation of an arc in the millisecond range, in particular also for reducing flicker. An improved inward coupling of power and a wide working range of the arc, in particular a wide range of the stability of the arc, will be provided. In addition to avoiding the unwanted collapse of the current, the probability of internal flashovers due to the occurrence of uncontrolled overvoltages will also be minimized. It will be possible to reduce the volume of a furnace transformer.

Some embodiments provide an apparatus for dynamically regulating an electric arc furnace electrically connected to a power supply system with at least one system phase is proposed, by means of which an alternating electrical voltage is applied with an amplitude and frequency to a furnace electrode for the generation of an arc current required for melting, with an amplitude and frequency, wherein a control loop device of the amplitude and/or the frequency of the alternating voltage in relation to the amplitude and/or the frequency of the arc current is formed, the converter is a two-port network comprising an input port and an output port, wherein a power supply system is attached to the input port and a melting furnace power supply is connected to the output port, a primary circuit of a first transformer is electrically connected to the output port, in the secondary circuit of which the furnace electrode of the electric arc furnace is electrically connected, wherein a primary coil of a second transformer is electrically connected in parallel to the input port of the converter, and a secondary coil of the first transformer is electrically connected in series with a secondary coil of the second transformer.

Other embodiments provide a method for dynamically regulating an electric arc furnace electrically connected to a power supply system with at least one system phase, by means of which an alternating electrical voltage is applied with an amplitude and frequency to a furnace electrode and an arc current required for melting is supplied with an amplitude and frequency, wherein a control loop device controls, with reverse feedback, the amplitude and/or the frequency of the alternating voltage or the amplitude and/or the frequency of the arc current, wherein the converter is a two-port network comprising an input port and an output port, wherein a power supply system is connected to the input port and a melting furnace power supply is connected to the output port, a primary circuit of a first transformer is electrically connected to the output port, in the secondary circuit of which the furnace electrode of the electric arc furnace is electrically connected, wherein a primary coil of a second transformer is electrically connected in parallel to the input port of the converter, and a secondary coil of the first transformer is electrically connected in series with a secondary coil of the second transformer.

In some embodiments, an energy required for melting is fed to the arc through an inverter, so that it does not extinguish. The advantageous use of a converter, which in particular can be an inverter, is proposed. Advantages of embodiments of the present invention may include a fast dynamic regulation, in particular in the millisecond range, to increase the power factor of a phase while effectively stabilizing the arc, and the possibility of reducing flicker.

The control loop device can, for example, use the amplitude and/or the frequency of the alternating voltage as the manipulated variable or manipulated variables, and the amplitude and/or the frequency of the arc current as the controlled variable or controlled variables. Alternatively it is in principle possible for regulation to use the amplitude and/or the frequency of the alternating voltage as the controlled variable of the amplitude, and/or the frequency of the arc current as the manipulated variable (n).

What is important is that, for example, a drop in power due to the arc current can be compensated for by feeding in power by means of the alternating voltage. In principle, it can also be the other way round.

According to one embodiment, the control loop device can regulate the amplitude and/or the frequency of the alternating voltage to the amplitude and/or the frequency of the arc current with reverse feedback by means of an electrical converter.

According to a further embodiment, the amplitude and/or the frequency of the alternating electrical voltage can be increased by means of the converter when the amplitude and/or the frequency of the arc current is reduced. Particularly advantageously, in order to avoid a collapse of an arc, the converter can increase the amplitude and/or the frequency of the alternating electrical voltage at a zero-transition of the phase of the arc. This procedure can also be used to avoid flicker.

Regulated with reverse feedback means that, by means of the control loop device and an electrical converter, the amplitude and/or the frequency of the alternating voltage can be increased when the amplitude and/or the frequency of the arc current become smaller. Conversely, in order to avoid over-voltages when the amplitude and/or frequency of the arc current increases, the amplitude and/or the frequency of the alternating voltage can be reduced.

According to a further embodiment, the converter can convert an alternating magnitude, in this case the alternating voltage or the alternating current, of the power supply system into the corresponding alternating magnitude of the furnace electrode with phase synchronicity.

According to a further embodiment, the converter can be electrically connected to any desired voltage level of the electrical power supply system.

According to a further embodiment, the converter can be a two-port network comprising an input port and an output port, wherein a power supply system can be attached to the input port and a melting furnace power supply can be connected to the output port.

A two-port network describes an electrical network with four terminals, in which each pair of terminals are grouped to form what is known as a port. A port is present when the electrical currents through the two terminals of a port are equal and opposite (port condition). A two-port network is thus a special form of a quadripole.

According to a further embodiment, the converter can be a two-point converter or a multi-level converter. According to a further advantageous embodiment, a primary circuit of a first transformer can be electrically connected to the output port, in the secondary circuit of which the furnace electrode of the electric arc furnace can be electrically connected.

According to a further embodiment, a primary coil of a second transformer can be electrically connected in parallel to the input port of the converter, and a secondary coil of the first transformer can be electrically connected in series with a secondary coil of the second transformer.

According to a further embodiment, a ratio of the primary electric rated power of the first transformer to that of the second transformer can be adjusted by means of appropriate dimensioning.

According to a further embodiment, this ratio can be set to 1:3.

According to a further embodiment, the first transformer or the second transformer can be a furnace transformer that is already present.

According to a further embodiment, the first transformer can be a step-up or boost transformer.

According to a further embodiment, the first transformer can be removed, and the output port of the converter can be electrically connected in series with the secondary coil of the second transformer and to the furnace electrode.

According to a further embodiment, the electric arc furnace can comprise three furnace electrodes, in particular graphite electrodes, supplied with power by the three system phases, wherein amplitudes and/or frequencies can be regulated by means of three converters.

According to a further embodiment, a separate regulation of amplitudes and/or frequencies can be performed by means of the three converters.

A power distribution can be adjusted very quickly and flexibly by means of the converters. The electrical power can, for example, be redistributed from a stably burning arc to another one that would otherwise extinguish. Depending on the design of the converter, the individual furnace electrodes can be supplied with different powers. This can be carried out effectively in addition to provide thermal symmetry of the arc furnace.

According to a further embodiment, it is in addition possible for a spacing device for one respective furnace electrode to adjust its distance from a melt as a working point. The working point is adjusted by means of a necessary process of the electrodes, wherein highly dynamic stabilization of disturbances can be provided through the regulation using the disclosed converter.

According to a further embodiment, a power factor of >0.84 in each phase can be set for each furnace electrode.

According to a further embodiment, the regulation of any respective arc can be carried out in the range of milliseconds.

According to a further embodiment, an ignition pulse can, in addition, be additionally injected at a zero-transition of the current.

FIG. 1 shows a first example embodiment of an apparatus according to the invention. According to this apparatus, an arc generated in an electric arc furnace 1 can be regulated more dynamically and flexibly in comparison with the prior art. In synchronism with the phase, a converter 5 in series with a first transformer 13, which can be a furnace transformer that is already installed, feeds the necessary energy to the arc concerned so that it does not extinguish. Flicker will also be avoided. The apparatus also permits the avoidance of over-voltages. All the network impedances, including that of the converter transformer, are aggregated into the impedances R and X shown. FIG. 1 shows a single-phase equivalent circuit diagram of an electric arc 1, in which all the power, that is 100%, is supplied through the converter 5. There is thus full control of the arc furnace 1, including the operating frequency, and a continuous adjustment of the voltage between 0 and 100%. If the electric arc furnace 1 permits a higher operating frequency than 50 or 60 Hz, this can be generated from the system frequency by the converter 5, and the downstream first transformer 13 can thus have a smaller and more economical construction. The first transformer 13 can be a furnace transformer already assigned to the arc furnace 1. G represents the feedback loop of a control loop device 3. Since the feedback here is reverse feedback, the feedback loop is identified with reference sign G.

According to FIG. 1, a system phase of a power supply system is connected to the electrically connected arc furnace 1. By means of this system phase a furnace electrode, arranged in the electric arc furnace and not illustrated here in more detail, is supplied with an alternating electrical voltage with an amplitude and frequency, and with an arc current required for melting with an amplitude and a frequency. A control loop device 3 is created, which provides reverse feedback to the amplitude and/or the frequency of the alternating voltage to the amplitude and/or the frequency of the arc current. Accordingly, when the amplitude and/or the frequency of the arc current falls, the amplitude and/or the frequency of the alternating voltage can be increased. Equally, if the amplitude and/or frequency of the alternating voltage is too large, the amplitude and/or frequency of the arc current can be reduced. In this way, extinguishing of the arc is avoided, as is the over-voltage. The control loop device 3 can be provided in a flexible manner such that either the alternating voltage can be the manipulated variable and the arc current the controlled variable, or that conversely the arc current can be the manipulated variable and the alternating voltage the controlled variable. If a converter 5 is used, it is in particular possible through an adjustment of the amplitude and/or frequency of the alternating voltage to regulate the amplitude and/or the frequency of the arc current. Basically, using the disclosed converter 5, either the alternating voltage or the arc current can be impressed. Accordingly, the converter 5 can then be considered as a voltage source or as a current source. FIG. 1 shows a power supply of an arc furnace through a converter. The converter 5 is illustrated here with a converter transformer 13, which can be a boost transformer. The advantages according to an arrangement according to FIG. 1 are a fast, dynamic regulation, in particular in the range of milliseconds, a reduction in flicker, a reduction in the volume of the first transformer 13, where, when a furnace transformer is used, the tap-changing switch at the primary side of the furnace transformer is no longer required. According to FIG. 1, a fast, dynamic regulation can be performed over the full power range. The advantage of an arrangement according to FIG. 1 is an increased dynamic range of the fast regulation in comparison with a hybrid solution illustrated in FIG. 2 with a furnace transformer and an inverter. The converter 5 can be electrically connected to any desired voltage level of an electric power supply system. The converter 5 according to FIG. 1 is a two-port network 11 comprising an input port 7 and an output port 9. A system power is present at the input port 7, and a melting furnace power is output at the output port 9.

Figure 2:
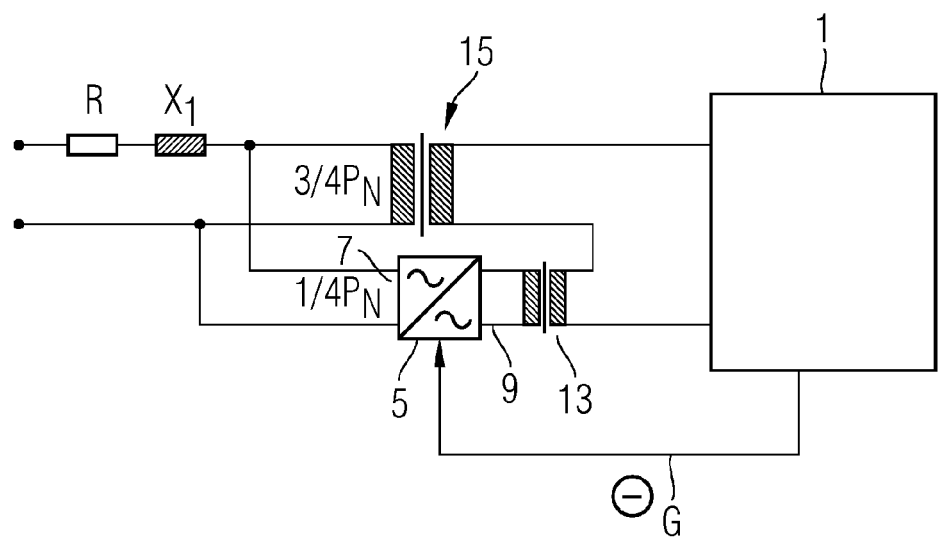
FIG. 2 shows a second example embodiment of an apparatus according to the invention.

FIG. 2 shows a second example embodiment of an apparatus according to the invention. A primary circuit of a first transformer 13, in the secondary circuit of which a furnace electrode, not illustrated, of the electric arc furnace 1 is electrically connected, is electrically connected to an output port 9. In contrast to FIG. 1, a primary coil of a second transformer 15 is electrically connected in parallel with the input port 7 of the converter 5, while a secondary coil of the first transformer 13 is electrically connected in series to a secondary coil of the second transformer 15. The secondary coils of the first transformer 13 and of the second transformer 15 supply the alternating electrical voltage to the furnace electrode, and the required arc current. FIG. 2 also shows a single-phase equivalent circuit diagram of an electric arc furnace, in which a part of the energy of the converter is fed to the downstream boost transformer or step-up transformer 13. With this, the alternating electrical voltage at the furnace electrode can be set, continuously and highly dynamically, between 50 and 100%, and this can also be asymmetrical.

Again in FIG. 2, all the system impedances, including those of the furnace transformer 15 and of the converter transformer 13, are aggregated into the illustrated impedance R, X. According to FIG. 1, a supply of power to the arc furnace 1 is provided through a furnace transformer 15 and a converter 5. FIG. 2 shows that the power is supplied, for example, up to 75% through the furnace transformer 15, and up to 25% through the converter transformer 13 to the arc furnace 1. Depending on the electrical power from the converter 5, dynamic properties of the arc can be regulated in the range of milliseconds. The generation of flicker can also be affected by the converter 5. For example, a short ignition pulse can also be injected at a zero transition of the arc current, to prevent the arc from extinguishing. The converter 5 generates a variable medium voltage from a fixed medium voltage of the power supply system. The downstream transformer 13 transforms the voltage down from the medium-voltage level to a low-voltage level. The advantages of the apparatus illustrated in FIG. 2 are as follows: a fast, dynamic regulation in the range of milliseconds, although only over the power range of the converter 5, a reduction in flicker, a reduction in the volume of a furnace transformer 15, while a tap-changing switch is no longer required at the primary side of the furnace transformer 15. The fast, dynamic regulation according to the invention prevents the arc from collapsing, since the power can be supplied to the arc individually. The reduction in flicker has the advantage that the compensation installation can be omitted with low flicker. The converter 5 can, depending on the voltage level, be implemented in various topologies; it can be constructed as a two-point or as a multi-level converter. The downstream transformer 13 in FIG. 2 behind the converter 5 can also, depending on the properties of the components and semiconductor switches, be designed appropriately or can possibly be omitted.

Figure 3:
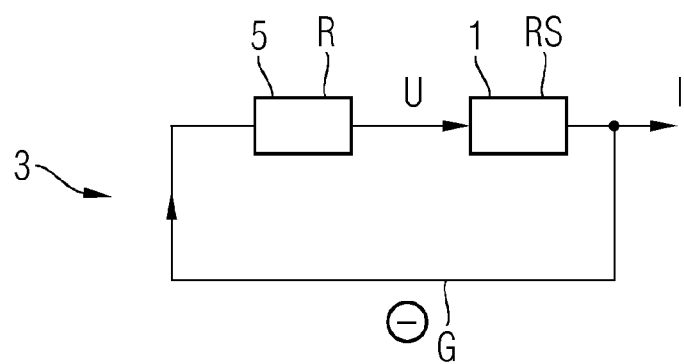
FIG. 3 shows the control loop for the apparatus according to the invention.

FIG. 3 shows an example control loop according to an embodiment of a control loop device 3, where a converter 5 is used as the controller and the electric arc furnace 1 as the control system RS. The converter 5 can, as the controller R, apply for example an alternating electrical voltage to a furnace electrode. The arc current I flowing from the furnace electrode or the arc furnace 1 can accordingly be detected. Both the alternating electrical voltage U and the arc current I can have ascertainable amplitudes and frequencies. The control loop device 3 comprising an electric converter 5 illustrated in FIG. 3 couples the amplitude and/or the frequency of the alternating voltage at a furnace electrode to the amplitude and/or the frequency of the arc current through this furnace electrode. Particularly advantageously, the converter 5 can simply adjust the amplitude and/or the frequency of the alternating electrical voltage of the furnace electrode as the manipulated variable (n) for regulation of the amplitude and/or frequency of the arc current as the controlled variable (n). Particularly advantageously, the control loop of the control loop device 3 can then increase the amplitude and/or the frequency of the alternating voltage by means of the converter 5 when the amplitude and/or frequency of the arc current reduces. This can be used for an arc to be generated stably and to avoid collapse of the arc. The same can be done to avoid flicker. An inverse adjustment of a reduction of the amplitude and/or the frequency of the alternating voltage when the amplitude and/or frequency of the arc current increases can effectively avoid over-voltages. Fundamentally, a converter 5 can set the amplitude and/or frequency of the arc current as the manipulated variable (n) for regulating the amplitude and/or frequency of the alternating electrical voltage as the controlled variable (n). Accordingly, a converter 5 can be considered as a voltage source that provides a voltage and/or as a current source that impresses a current.

Figure 4:
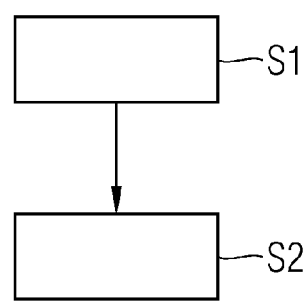
FIG. 4 shows an example embodiment of a method according to the invention.

FIG. 4 shows an example embodiment of a method according to the invention. In a first step S1 the amplitude and/or the frequency of an arc current is reduced. With a second step S2, by means of an electrical converter 5, the amplitude and/or the frequency of the alternating voltage at the furnace electrode is increased. With this corresponding reverse feedback a collapse of an arc and a flicker can be effectively avoided. Alternatively an increase in the amplitude and/or the frequency of an arc current can be detected in a first step S1, so that in a second step S2 by means of an electrical converter 5 the amplitude and/or the frequency of the alternating voltage is reduced. In both these variants, the alternating voltage at the furnace electrode is a manipulated variable, and the arc current is a controlled variable.

The invention claimed is:

1. An electric arc furnace comprising:
   a power supply system with at least one system phase for applying an alternating electrical voltage and an arc current;
   a furnace electrode fed by the power supply system;
   a control loop device comprising an electrical converter configured for reverse feedback of an amplitude and/or a frequency of the alternating voltage to an amplitude and/or a frequency of the arc current, wherein the electrical converter comprises a two-port network comprising an input port and an output port;
   the power supply system attached to the input port;
   a melting furnace power supply connected to the output port;
   a primary circuit of a first transformer electrically connected to the output port;
   a secondary circuit of the first transformer electrically connected to the furnace electrode;
   a primary coil of a second transformer electrically connected in parallel to the input port of the electrical converter; and
   a secondary coil of the second transformer electrically connected in series with a secondary coil of the first transformer.

2. The furnace of claim 1, wherein a ratio of a primary electric rated power of the first transformer to one of the second transformer is adjustable.

3. The furnace of claim 1, wherein a ratio of the primary electric rated power of the first transformer to that of the second transformer is 1:3.

4. The furnace of claim 1, wherein the first transformer is a step-up or boost transformer.

5. The furnace of claim 1, wherein the first transformer is removed, and the output port of the converter is electrically connected in series with the secondary coil of the second transformer and to the furnace electrode.

6. The furnace of claim 1, wherein the electrical converter adjusts the amplitude and/or the frequency of the alternating electrical voltage as the manipulated variable for controlling the amplitude and/or frequency of the arc current as the controlled variable.

7. The furnace of claim 1, wherein the electrical converter adjusts the amplitude and/or the frequency of the arc current as the manipulated variable for controlling the amplitude and/or frequency of the alternating electrical voltage as the controlled variable.

8. The furnace of claim 1, wherein the electrical converter increases the amplitude and/or the frequency of the alternating voltage when the amplitude and/or the frequency of the arc current is decreased, and decreases the amplitude and/or the frequency of the alternating voltage when the amplitude and/or the frequency of the arc current is increased.

9. The furnace of claim 4, wherein the electrical converter decreases the amplitude and/or the frequency of the arc current when the amplitude and/or frequency of the alternating voltage increases, and increases the amplitude and/or the frequency of the arc current when the amplitude and/or frequency of the alternating voltage decreases.

10. The furnace of claim 1, wherein the electrical converter converts an alternating magnitude of the power supply system into an alternating magnitude of the furnace electrode with phase synchronicity.

11. The furnace of claim 1, wherein the electrical converter is configured for electrical connection to any desired voltage level of the electrical power supply system.

12. The furnace of claim 1, wherein the electric arc furnace comprises three graphite furnace electrodes supplied with power by three system phases, wherein amplitudes and/or frequencies are controllable by three converters.

13. The furnace of claim 12 wherein amplitudes and/or frequencies are separately controllable by the three converters.

* * * * *